Nov. 17, 1970  K. FEIX  3,540,784
PEDESTAL BEARING ARRANGEMENT
Filed Oct. 22, 1968
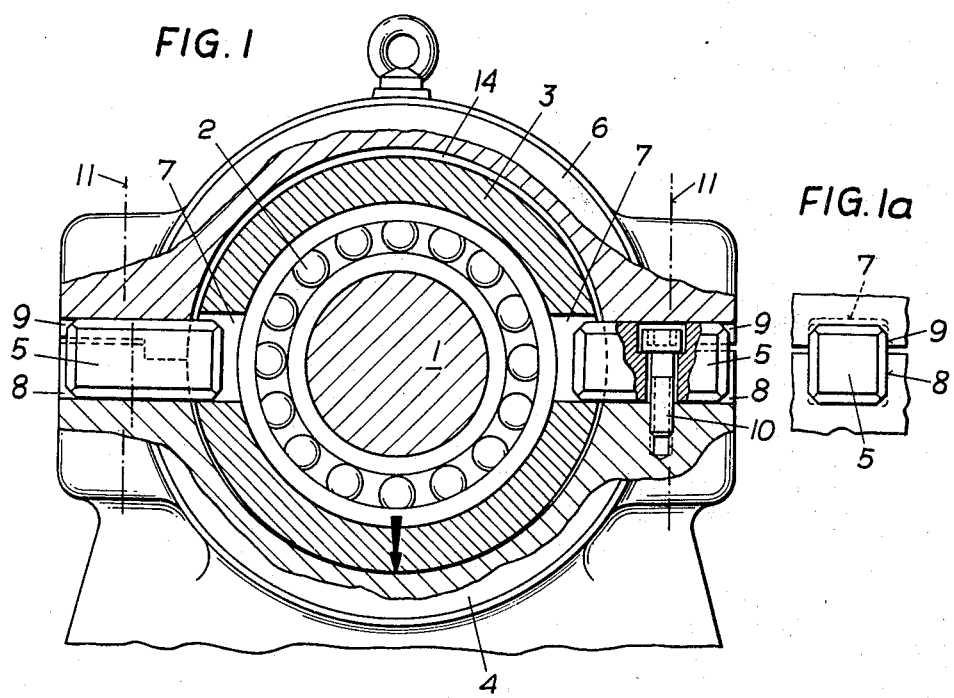
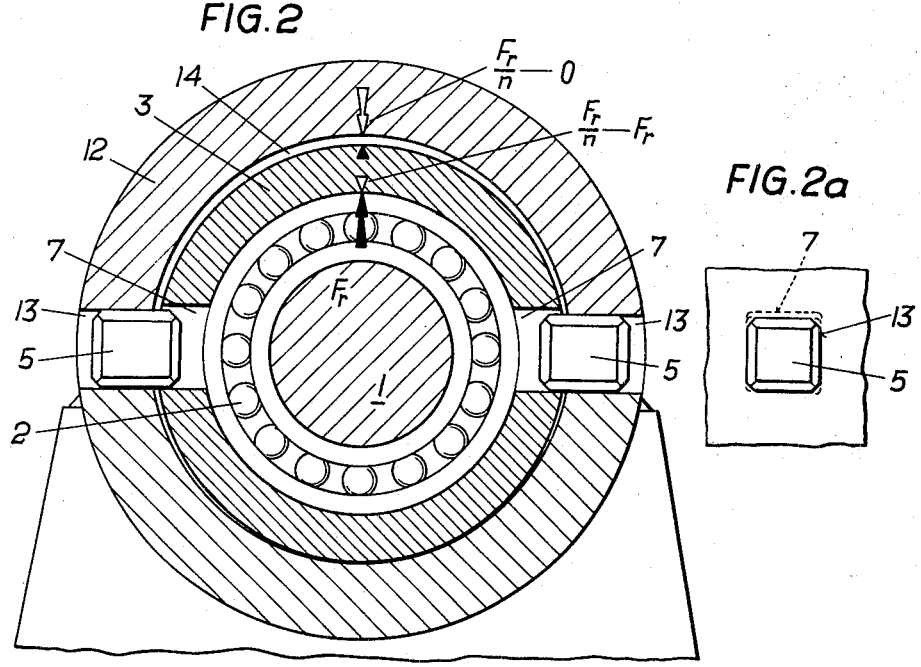
INVENTOR.
KURT FEIX United States Patent Office 3,540,784
Patented Nov. 17, 1970

3,540,784
PEDESTAL BEARING ARRANGEMENT
Kurt Feix, Steyr, Austria, assignor to Vereinigte Osterreichische Eisen- und Stahlwerke Aktiengesellschaft, Linz, Austria, a company of Austria
Filed Oct. 22, 1968, Ser. No. 769,606
Claims priority, application Austria, Nov. 6, 1967,
A 9,956/67
Int. Cl. F16c *13/00, 35/00*
U.S. Cl. 308—74      2 Claims

ABSTRACT OF THE DISCLOSURE

The invention relates to a bearing arrangement, particularly, for the trunnions of tiltable converters, and provides a stationary bearing housing containing an undivided lining bushing encasing the bearing and connected to the lower part of said housing, the connection means being designed as fitting blocks arranged in the horizontal plane extending through the axis of the part to be mounted in the bearing, e.g. the trunnion, said fitting blocks being inserted in corresponding openings of the bushing and bearing housing, there being a clearance between the bushing and the upper housing portion.

---

The present invention relates to a pedestal bearing arrangement for heavy machine units, in particular for tiltable converters having diametrically opposite trunnions, comprising an undivided lining bushing arranged in a stationary bearing housing and encasing the bearing and the trunnion, respectively, said lining bushing being connected to the lower portion of said bearing housing.

Bearing arrangements embodying such bushings are used in particular for the expansion mounting of roller bearings. The bushings permitted an axial displacement of the trunnion transmit the bearing load in the direction of the main load pressure and may be substituted when damaged by wear. In its mounted position the lining bushing must be secured against rotation and fixed in axial direction. This may be achieved by means of a centering fitting key and lateral lids or by means of pins. In the case of heavy machine units, in particular converters, the bearing load prevailing is so great that it requires very heavy constructions for not only the lower portion of the housing but also for the upper portion thereof. Hence it follows that in these cases the outer diameters of housings embodying bushings are undesirably great and the overall constructions become extremely heavy.

It is well established fact that it depends upon the direction of the main load how much radial load a housing may be capable of accommodating. Thus, for instance, a radial load active in the direction of the upper portion of the housing, i.e. opposed to the direction of the main load, must not be greater than about ⅓ of the bearing load in the direction of the main load.

The present invention has as its object to avoid these disadvantages and difficulties by providing a bearing arrangement, in which radial loads are partly accommodated by the bushing, in particular a construction adapted to accommodate stresses active in the direction of the upper portion of the housing, opposite to the direction of the main load, whereby the stresses affecting the upper portion of the housing are reduced and lighter constructions having smaller outer diameters are obtained.

The invention comprises a pedestal bearing arrangement for heavy machine units containing an undivided bushing arranged in a stationary bearing housing and encasing the bearing and the trunnion, respectively, said bushing being connected to the lower portion of said housing, and consists in providing connecting means in the form of fitting blocks preferably arranged in a horizontal plane extending through the trunnion axis, which fitting blocks are inserted in corresponding openings of the bushing, on the one hand, and of the housing or parts thereof, on the other hand, a clearance being provided between the bushing and the upper portion of the housing.

Suitably two fitting blocks are provided arranged in diametrically opposite positions in the horizontal plane extending through the trunnion axis and fixed to the lower portion of the housing, preferably by means of screws.

The invention is applicable to both divided housings, i.e. housings having a separate base and lid, and undivided housings.

In order that the invention may be more fully understood two embodiments thereof will now be described with reference to the accompanying drawings, in which:

FIG. 1 is a vertical sectional view of a construction embodying a divided housing, FIG. 2 is a vertical sectional view of a construction embodying an undivided housing, FIGS. 1a and 2a are fragmentary side views illustrating the arrangement of the fitting blocks.

Reference numeral 1 denotes the part to be mounted in the bearing, e.g. the trunnion of a converter. The bearing is designed as a roller bearing, e.g. a pendulum roller bearing 2, and is encased by an undivided lining bushing 3. The lining bushing 3 is supported on the lower portion 4 of the stationary bearing housing and is positively connected thereto by means of two fitting blocks 5. The lower portion 4 of the housing carries the upper portion 6 thereof fixed thereto by screws 11. The fitting blocks 5 are arranged diametrically opposite each other in the horizontal plane extending through the trunnion axis and they are inserted in a window-like opening 7 of the lining bushing 3 on the one hand and on the other hand in groove-like recesses provided in the lower portion 4 and the upper portion 6 of the housing, said groove-like recesses complementing each other to form a corresponding window-like opening. The groove-like recess in the lower portion of the housing is referred to with numeral 8, the groove-like recess in the upper portion with 9. The blocks 5 are fixed in their positions by screws 10. Apart from providing a stress-transmitting connection between the lining bushing 3 and the lower housing portion 4 the blocks 5 serve for fixing and centering the upper housing portion 6.

In the embodiment shown in FIG. 2 the housing 12 is undivided. The lining bushing 3 is provided with a window-like opening 7. A corresponding window-like opening 13 is provided in the housing 12. The fitting blocks 5 establish a positive connection between lining bushing and bearing housing. Suitably the fitting blocks are fixed in their positions, also in this embodiment, e.g. by a snug fit in the opening 13.

Referring to FIGS. 1 and 2, there is a clearance between the lining bushing 3 and the upper housing portion 6, FIG. 1, as well as between the bushing 3 and the upper half of the housing 12. FIG. 2, said clearance being denoted with numeral 14. If, in the course of operation, radial forces act on the housing, which forces deviate from the direction of the main load, in particular forces that are opposed to the direction of the main load, these forces are accommodated to a large extent by the lining bushing, owing to the stress-transmitting connection between bushing and lower housing portion, while the upper housing portion remains essentially unaffected. This is illustrated by the arrows in FIG. 2. $F_r$ is a force acting opposite to the direction of the main load. A definite fraction of that force is accommodated by the bushing 3, referred to with the symbol $F_r/n \rightarrow F_r$, FIG. 2. The remaining stress to be accommodated by the upper housing portion is symbolised by $F_r/n \rightarrow 0$, FIG. 2, which means that in the extreme case the upper housing portion remains fully unaffected by stresses. Thus the upper housing portion of the invention may be dimensioned much lighter than in known constructions. A simpler, cheaper and space-saving construction is obtained.

What I claim is:

1. A pedestal bearing arrangement for trunnioned heavy machine units, comprising a stationary bearing housing consisting of a lower portion and an upper portion, and containing an undivided lining bushing encasing a bearing with a trunnion received therein, said bushing being connected to said lower housing portion by fitting blocks inserted in corresponding openings provided in said bushing, on the one hand, and in said bearing housing, on the other hand, a clearance being provided between said bushing and said upper portion of said bearing housing.

2. A bearing arrangement as set forth in claim 1, wherein two fitting blocks are provided, which are arranged in diametrically opposite positions in a horizontal plane extending through the axis of said trunnion and are fixed in their positions on said lower portion of said bearing housing.

References Cited

UNITED STATES PATENTS

| | | | |
|---|---|---|---|
| 1,792,618 | 2/1931 | Van Derhogf | 308—236 |
| 3,071,419 | 1/1963 | Lower | 308—74 |
| 3,291,541 | 12/1966 | Dellinger | 308—59 |
| 3,311,427 | 3/1967 | Toth | 308—59 |

FRED C. MATTERN, Jr., Primary Examiner

F. SUSKO, Assistant Examiner

U.S. Cl. X.R.

308—189